Oct. 3, 1950  J. FIEUX  2,524,311
MULTIPLE DISK FRICTION COUPLING
Filed May 9, 1946
2 Sheets-Sheet 1

INVENTOR
Jean Fieux.
BY Cameron, Kerkam & Sutton
ATTORNEYS

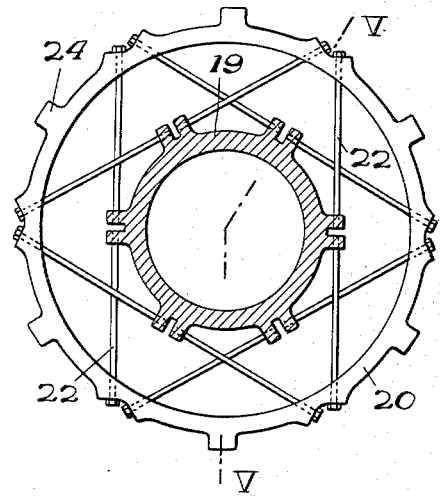
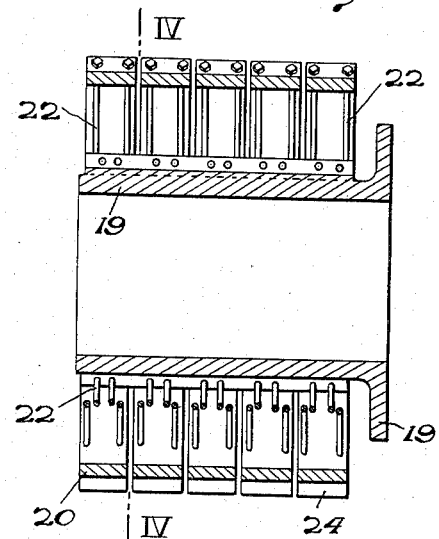
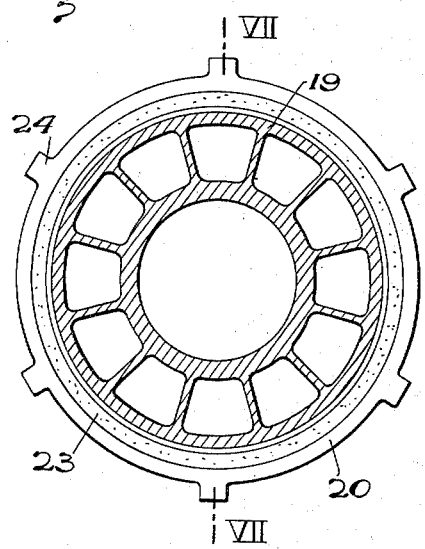
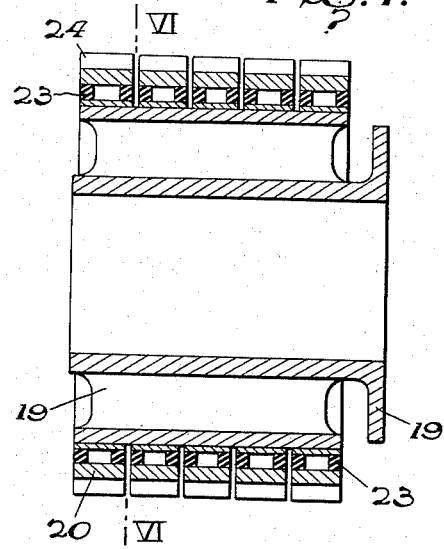

Patented Oct. 3, 1950

2,524,311

UNITED STATES PATENT OFFICE 2,524,311

MULTIPLE-DISK FRICTION COUPLING

Jean Fieux, Paris, France, assignor of one-half to Schneider & Cie, Paris, France, a limited joint-stock company of France Application May 9, 1946, Serial No. 668,346
In France September 1, 1941

Section 1, Public Law 690, August 8, 1946
Patent expires September 1, 1961

6 Claims. (Cl. 192—69)

This invention relates to multiple disc friction couplings.

The problem of the engaging and disengaging of a clutch, always difficult to solve in a really satisfactory manner, appears particularly so when, in order to transmit a torque of high value, it is sought to contrive a device both easy to control and satisfactory in space occupied.

The present invention relates in particular to multiple disc clutch devices which present in a relatively restricted space a considerable total friction surface, the use of which is necessary when it is required to transmit a considerable torque over a prolonged period of slipping, for example when it is a question of effecting the starting of heavy trains with a Diesel engine locomotive and with mechanical transmission, but which in the present state of the art present, together with considerable advantages, grave inconveniences which it is the object of the present invention to obviate.

In particular from the fact of the frictional resistance which exists between the discs and the driving slots or keys, the controlling pressure experiences, on the engagement of the clutch, a certain difficulty in being uniformly propagated from one extremity to the other of the series of discs. The result, at least momentarily, from one end to the other of the series of discs, is a decrement in the said controlling pressure and this decrement has as a consequence that the driving friction generally reaches its full value only after a certain delay and often well after the end of the period of slip. To ensure the starting of the driven shaft under suitable conditions, it is then necessary to increase the controlling thrust, which has for effect to overload the first discs and to produce unequal wear between the frictional elements.

Conversely, at the moment of disengaging the clutch, the same frictional resistance between the slots or grooves and the discs prevents the relaxing of the pressure from being transmitted instantaneously and completely from one end to the other of the device. In order to ensure a total disengagement, it is necessary to have recourse to an auxiliary device in order to separate the discs. This device is generally constituted in the well-known manner by sets of springs which are interposed and of rods actuated by the disengaging slide block; it requires the periodical adjustment of numerous members and its operation necessitates a long stroke for the slide block.

These drawbacks are particularly disadvantageous in the case of automatic couplings, in which the complete connection and the absolute disengagement respectively are caused by an increase beyond a given value and by a reduction below another given value of the action which centrifugal force exerts on suspended masses driven by the driving shaft. The drawbacks in question lead, in effect, to an excessive lack of precision of these two values of centrifugal action for the degree of automatic functioning which it is necessary to ensure for satisfactory conditions. The end of the coupling slip is, mostly, only produced at too high a speed of the driving shaft, whereas the partial unclutching only commences below too low a speed, that is to say, with a torque too much reduced, there being furthermore a risk of the disengagement no longer being absolutely ensured even at the extreme reduced speed of the engine.

It is therefore of the greatest advantage to eliminate the cause which produces such drawbacks.

To this end, the present invention consists of a multiple disc clutch wherein:

1. The outer discs are caused to make contact with grooves or slots of the driving member through elements which are elastic and deformable in the direction of the axis, and 2. The inner discs are each mounted on an individual hub with driving slots or grooves and connected themselves to the principal hub through an elastic element capable of deformation in the direction of the axis.

Whilst eliminating the drawbacks which have been referred to above, the devices in question furthermore present the undoubted advantage of playing the part of a flexing member between the driving shaft and the driven shaft.

On the other hand, in order to avoid imposing useless fatigue on the elastic elements just referred to, the invention furthermore consists, with a view to limiting to the strictly necessary value the pressure of clutch control intended to cause the engagement of the discs, in first mounting telescopically each of the actuating weights on its suspension lever, interposing between these two members a suitably calibrated compression spring, and in the second place in limiting by a suitable stop the maximum stroke of the said weights.

Finally, still according to the invention, small auxiliary springs interposed between the clutch levers and the driving member on which these latter are hinged, permanently neutralize a certain fraction of the centrifugal effect due to which the inopportune stoppages of the engine, arising from a premature engagement or the maintenance in engagement of the clutch for an insufficient value of the driving torque, are avoided.

In a general way, the whole of the means which have been referred to permits of obtaining an automatic coupling of great power capable of satisfying the present requirements of industry and presenting the advantages of great facility of control and perfect reliability of operation.

On the accompanying drawing there are shown and hereafter there are described one particular method of carrying out the invention and different modifications of embodiment, but it will be well understood that this method of execution and these modifications of embodiment could be modified in their details of execution and be supplemented by any useful accessory device without thereby departing from the scope of the invention.

Figures 4 and 5 show a first modification of embodiment of the driven hub or boss, Figure 4 being a section on the line IV—IV of Figure 5, and the latter being an axial section on the line V—V of Figure 4.

Figures 6 and 7 show a second modified embodiment of the said driven hub, Figure 6 being a section on the line VI—VI of Figure 7, and the latter being an axial section on the line VII—VII of Figure 6.

Figure 2:
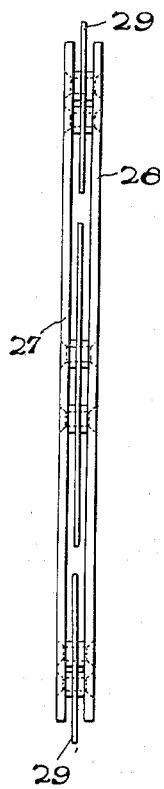
Figure 2 is an external side view of an outer (driving) disc.

On a driving shaft 1 is fixed a casing 2 comprising ventilation apertures 3, internal projections 4 forming keys, a certain number of pairs of supporting cheeks 5—6 and also guide bosses 7.

Each pair of cheeks 5—6 carries on the one hand a control lever 8 mounted on a hinge pivot 9, and on the other hand a stop roller 10 rotating on an axis or pivot 11.

Each of the bosses 7 serves as a guide for a push rod 12 and as a recess for a spring 13 which bears, at the other end, on one of the extremities of the lever 8. This latter comprises an off-set socket 14 in which moves the guiding rod of a centrifugal mass 15. A spring 16 mounted in tension between the socket 14 and a terminal collar with which the said guiding rod is provided, keeps the mass 15 in absolute connection with the lever 8 as long as the centrifugal force which is exerted on the said mass is less than the initial tension of the said spring.

The casing 2 has a threaded closure disc 17 held in position by a ring 18 also threaded and forming a lock nut.

Figure 3:
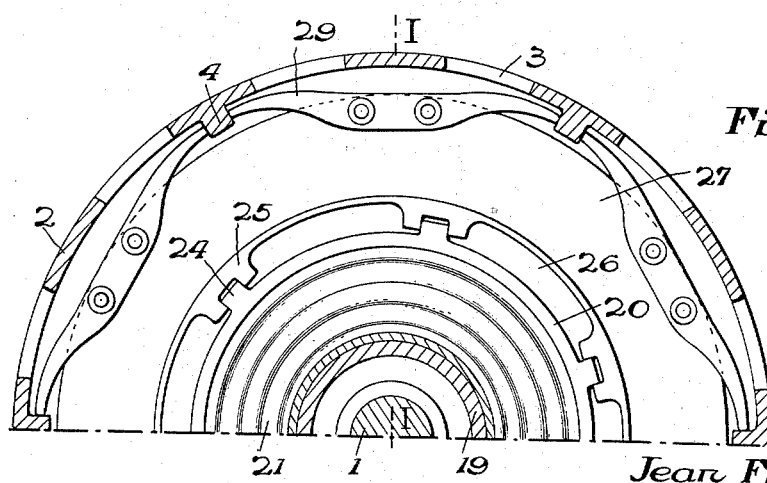
Figure 3 is a section on the line III—III of Figure 1.

The extremity of the driving shaft 1 is journalled in a driven hub 19 on which are mounted a certain number of rigid rims 20 which are attached thereto through elastic elements such as corrugated metal plates 21 (see Figures 1 and 3), or tie bolts of steel wire 22 (see Figures 4 and 5), or rings of adherent rubber 23 (see Figures 6 and 7).

The rims 20 comprise key-like projections 24 each of which receives an internal friction disc (driven disc) 25 which is capable of sliding parallel to the axis and which comprises, apart from the usual notches serving for the passage of the said key-like projections, wide ventilation recesses 26.

The outer discs (driving discs) which alternate with the inner discs (driven discs) mentioned above are each constituted by a pair of side or cheek plates 27, 28 suitably braced and carrying flexible blades 29 through the intermediary of which they bear freely on the projections 4. A compressor plate 30 which itself rests on the said projections 4, is interposed, according to the usual practice, between the first driven disc and the whole of the push rods 12. The last driven disc is in contact with the closure disc 17 the position of which is adjustable.

The driving casing 2 has a disengaging slide block 31 of the usual type.

The hub 19 is integral with a driven shaft 32.

Figure 1:
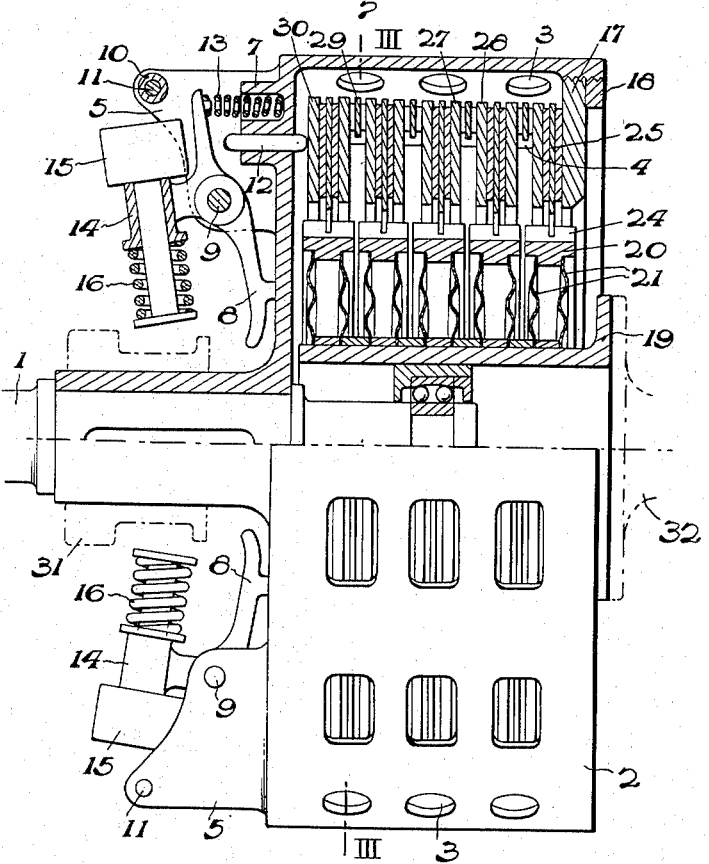
Figure 1 is an external view and semi-axial section on the line I—I of Figure 3, of the whole of the apparatus which is here shown at rest.

The mechanical functioning of the device may be easily followed by referring to Figure 1.

When the apparatus is not in operation or when the driving shaft rotates at a speed lower than that which produces the minimum torque capable of being transmitted, the levers 8 are, under the thrust of the springs 13, kept in the position indicated in Figure 1, out of contact with the thrust rods 12 and are supported against the casing 2. No pressure is then applied to the discs, the freedom of axial movement of which is such that the residual friction is practically negligible. The declutching is absolute and the running of the engine is possible at the extreme idle running speed without it being necessary either to shift the sliding block 31 or to put the transmission mechanism at the "dead" point.

As soon as the speed of the engine becomes greater than that which produces the minimum torque capable of being transmitted, the centrifugal effect on the masses 15 prevails over the antagonistic thrust of the springs 13. The levers 8 then move up and come into contact with the thrust rods 12. The different members remain in this same relative position up to the moment when the speed of the engine reaches the value at which the centrifugal force exerted on the masses 15 becomes equal in absolute value to the antagonistic tension of the springs 16. During this period the pressure on the discs varies with the speed of the motor which, during the period of slipping, is stabilized at a practically constant value approximately half its normal running speed to then increase, with the speed of the driven shaft, according to the conditions permitted by the resistance.

Finally, as soon as the speed exceeds that at which the centrifugal force exerted on the masses 15 equalizes the tension of the springs 16, these masses are subjected to a radial displacement which brings them finally into contact with the abutments 10 at the moment when the speed of the shafts reaches the value beyond which the pressure ceases to increase on the friction discs and then, in fact, only corresponds to the constant tension finally taken by the springs 16. It is precisely this tension which it is sufficient to overcome in order to obtain the declutching by the action of the slide block 31.

From the fact of the extreme axial mobility of the discs, the useful stroke of the slide block is relatively slight because the complete separation of the friction surfaces is obtained quite naturally as soon as the levers 8 lose contact with the thrust rods 12. It is thus possible to provide a control device for the slide block much reduced in gear ratio and requiring but little effort exerted on the manipulating member.

The wear of the linings is easily compensated by means of a suitable displacement of the closure disc 17 to the exclusion of all other adjustments.

A current of air favorable to the cooling of the discs during rotation is established owing to the openings 26, to the spaces left free between the cheeks or side plates 27 and 28, and to the apertures 3 in the driving casing.

Finally, it is to be noted that the small stroke required by the slide block, the utilization for many purposes of the usual declutching levers, to the exclusion of all others, and the angular flexibility of the line of shaft generally assured by a supplementary flexing member but which here is amply provided by the interposing of the elastic elements 21, 22 or 23 permit of constructing the apparatus in a comparatively reduced longitudinal space which constitutes an important advantage in the majority of cases of application.

I claim:

1. A multiple disc friction clutch comprising coaxial, rotatable driving and driven members, a plurality of interleaved driving and driven clutch discs axially movable relatively to one another and to said driving and driven members, clutch operating means for moving the driving and driven clutch discs into frictional engagement with one another, means for transmitting driving torque from the driving member to the driving clutch discs including elastic elements fixed to said driving clutch discs and deformable in the direction of the axis of rotation of the clutch, and means for transmitting driving torque from the driven clutch discs to said driven member including a separate hub for each of said driven discs coaxial with and interposed between said disc and said driven member, means for mounting said driven discs on said hubs in non-rotatable but axially movable relation there to, and elastic means deformable in the direction of the axis of rotation of the clutch constituting the torque transmitting connection between each of said hubs and said driven member.

2. A multiple disc friction clutch according to claim 1 wherein the elastic elements fixed to the driving clutch discs comprise flexible blades connected to the peripheries of said discs and extending parallel to the planes thereof, and the driving member includes projections fixed thereto in abutting engagement with the ends of said flexible blades.

3. A multiple disc friction clutch according to claim 1 wherein the elastic means connecting each of the hubs to the driven member comprises an annular corrugated metal plate fixed at its outer and inner peripheries to the hub and driven member, respectively.

4. A multiple disc friction clutch according to claim 1 wherein the elastic means connecting each of the hubs to the driven member comprises a plurality of flexible tie rods each fixed to both the hub and the driven member and normally extending in a direction substantially perpendicular to the axis of rotation of the clutch.

5. A multiple disc friction clutch according to claim 1 wherein the elastic means connecting each of the hubs to the driven member comprises a rubber ring interposed between and bonded to the hub and the driven member.

6. A multiple disc friction clutch according to claim 1 wherein each of said driving clutch discs comprises a pair of parallel plates fixed to one another in spaced apart relation and the elastic elements fixed to each disc are in the form of flexible blades mounted between said plates and projecting beyond the peripheries thereof, the driving member including means for transmitting driving torque to the projecting portions of said blades.

JEAN FIEUX.

REFERENCES CITED

The following references are of record in the file of this patent:

UNITED STATES PATENTS

| Number | Name | Date |
|---|---|---|
| 943,804 | Baumgartner | Dec. 11, 1909 |
| 1,700,244 | Wemp | Jan. 29, 1929 |
| 1,757,517 | Eaton | May 6, 1930 |
| 1,849,164 | Wood | Mar. 15, 1932 |
| 1,855,643 | Mathews | Apr. 26, 1932 |
| 2,216,771 | Evans | Oct. 8, 1940 |

FOREIGN PATENTS

| Number | Country | Date |
|---|---|---|
| 11,341 | Great Britain | May 30, 1905 |
| 204,425 | Germany | Nov. 23, 1908 |